United States Patent Office 3,236,904
Patented Feb. 22, 1966

3,236,904
HYDRODEALKYLATION PROCESS
Paul E. Pickert, North Tonawanda, N.Y., assignor to Union Carbide Corporation, a corporation of New York
No Drawing. Filed Feb. 7, 1962, Ser. No. 171,586
17 Claims. (Cl. 260—672)

This invention relates to an improved process for the hydrodealkylation of alkyl aromatics, and more specifically, to such a process employing crystalline zeolitic molecular sieve catalyst material.

The need for such a process is reflected in the demand for benzene and naphthalene as chemical intermediates, which need is considerably greater than the methyl-substituted hydrocarbons and is reflected in the currently high prices of these chemicals. Furthermore, it is predicted that the future demands will increase at a rate at least three times as rapidly as the increased demand for the methyl-substituted counterparts. Benzene and naphthalene are, for example, used in the synthesis of phenol, styrene, phthalic anhydride and many other useful end products.

Probably the most widely employed prior art method of dealkylating substituted aromatics has been thermal cracking, with or without the presence of hydrogen gas, at temperatures between 650° C.–800° C. These very high temperatures necessitate the reactor units to be constructed of high-cost steels and require costly heating units. Catalytic processes have been developed that require lower reaction temperatures; i.e. 500°–600° C. However, the known catalysts provide a carbonium ion type cracking reaction mechanism in contrast to the essentially radical mechanism of thermal cracking. In the first mentioned acid catalyzed reaction, competing isomerization and disproportionating reactions accelerate coke deposition and reduce the yield of the valuable lower molecular weight aromatic hydrocarbons.

Thermal cracking generally results in a —C—C— scission at least one carbon atom removed from the ring. In n-propylbenzene the bond dissociation energy of the alpha-bond is approximately 25 Kcal./mol greater than the beta-bond. As such, toluene and xylenes are resistant to thermal dealkylation and are preferentially produced from larger alkyl-substituted benzene. The dealkylation of alkyl-substituted aromatics in an atmosphere of hydrogen (hydrodealkylation) may be expressed by the equation:

$$A-R+H_2 \rightarrow A-H+R-H \qquad (I)$$

where A— represents the aromatic nucleus and R— the alkyl-substituent. The equilibrium for the reaction of toluene and hydrogen to yield benzene and methane is over 90% at temperatures between 0°–1000° C. Pressure should have little effect on the reaction, only to the extent that adsorption and desorption (contact time) of the hydrocarbon on the catalysts is affected, since the volumes of the reactants and products are equal.

Another disadvantage of the prior art hydrodealkylation processes is the occurrence of transalkylation—the appearance in the product of compounds having a greater degree of alkylation than the feed, e.g. xylene product from toluene feed. Transalkylation is objectionable when a maximum yield of benzene is sought, and is indicative of ionic type catalytic activity.

An object of this invention is to provide an improved process for the hydrodealkylation of alkyl aromatics which is effective at lower temperatures than heretofore employed, and which involves primarily a radical mechanism thereby minimizing coke deposition, and which also maximizes the yield of valuable lower molecular weight aromatic hydrocarbons with a minimum amount of transalkylation.

Other objects and advantages of this invention will be apparent from the ensuing disclosure and appended claims.

It has been discovered that certain metal cationic crystalline zeolitic molecular sieves are remarkably effective catalysts for the hydrodealkylation reaction. These molecular sieves must have uniform, apparent pore sizes of at least about 6.6 Angstrom units, that is, large enough to readily admit and release molecules the size of benzene and larger. When the silica-to-alumina ratio $$(SiO_2/Al_2O_3)$$

of the molecular sieve is less than about 3, the cations neutralizing the negative charges on the 4-coordinated alumina tetrahedra may be monovalent or polyvalent, or a combination thereof. Thus, cations such as lithium, sodium, potassium, rubidium, cesium, calcium, magnesium and the like are suitable. However, when the silica-to-alumina ratio of the molecular sieve is greater than 3, the cation must be a monovalent metal. It is to be understood that minor quantities of polyvalent cations may be present, e.g. less than about 10 percent of the cation content, when molecular sieves having a silica-to-alumina ratio of greater than 3 are employed to practice this invention. This is because the sieve still retains the characteristics of the monovalent cationic form when such small quantities of polyvalent cations are present.

The reason for this criticality is found in the molecular arrangement of the sieve materials. When the silica-to-alumina ratio is greater than 3, the distance between adjacent anion sites is dimensionally so great that a single polyvalent cation such as calcium cannot reside at a location equally distant between such anions, and is consequently closer to one anion than the other. This relatively greater spacing between the polyvalent cation and at least one anion permits ionic disruption and the undesired ionic type reactions. On the other hand, when monovalent metal cations are present in a molecular sieve having a silica-to-alumina ratio greater than 3, more cations are present than in the case of polyvalent cations. For example, twice as many Na cations are present as would be Ca cations. This means that the spacing between cations and anions in the molecular sieve structure is relatively small, and the ionic type reactions cannot proceed. Sodium is the preferred cation since the crystalline zeolites are commonly synthesized in this form and zeolitic cation exchange procedures are not necessary. Furthermore, the sodium cationic form is the most active hydrodealkylation catalyst, as will be shown later in this disclosure.

The alkyl-substituted aromatic hydrocarbon feed is contacted with the crystalline zeolitic molecular sieve in a hydrogen atmosphere at temperatures between about 400° and 650° C.

The reaction mechanism provided by the catalysts of this invention is primarily of a radical type similar to that observed in uncatalyzed thermal cracking. This is apparent from the lack of any detectable quantities of higher molecular weight hydrocarbons in the reaction product which would be formed through disproportionation and condensation reactions with acidic type catalysts that promote carbonium ion type reactions mechanisms. Good yields of unsubstituted aromatics are obtained with the catalysts of this invention at 100–250 degrees lower temperature than needed in straight thermal-dealkylations and hydrodealkylations. Therefore, the reactors need not be constructed of high-cost alloy steels. Equipment and process conditions common in petroleum and petrochemical industries can be used. Hydrogenation of the aromatic nucleus is slight and subsequent loss in yield due to cracking during the reaction is negligible. Coke formation is minor and the process can be operated for long periods of time without the need for frequent oxidative regenerations.

In contrast to thermal hydroalkylations which require high pressures of hydrogen to increase the conversion and reduce coke formation, the conversion in the process of this invention is increased as lower pressures are used. Cracking is reduced since even less hydrogenation of the aromatic nuclei occurs. Although super atmospheric pressures up to about 1000 p.s.i.g. are satisfactory, moderate pressures of 50–600 p.s.i.g. are preferred to eliminate the tendency for coke formation to occur at this condition. Hydrogen to hydrocarbon molar ratios of 1 to 20 are suitable. The degree of conversion is increased as this ratio is increased, and a value of 5 to 15 is preferred. Water is not needed nor desired to effect conversion. Superior conversions are obtained if the weight-hourly-space-velocity of the hydrocarbon feed is between about 0.5 and 2.0 grams feed per gram catalyst per hour.

The term "zeolite," in general, refers to a group of naturally occurring hydrated metal aluminosilicates, many of which are crystalline in structure. However, a number of synthetic crystalline zeolites have been prepared. They are distinguishable from each other and from the naturally occurring material, on the basis of their composition, by crystal structure and adsorption properties. A suitable method for describing the crystal structure, for example, is by their X-ray powder diffraction patterns.

Crystalline zeolites structurally consist basically of an open 3-dimensioned framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electro-valence of tetrahedra containing aluminum is balanced by the inclusion within the crystal, of cations, e.g., alkali metal or alkaline earth metal cations. This balance may be expressed by the formula $2Al/(2Na, 2K, 2Li, Ca, Ba, Sr, etc.)=1\pm 0.15$. Moreover, it has been found that one cation may be replaced by another by suitable exchange techniques. Consequently, crystalline zeolites are often employed as ion-exchange agents.

It is also known that the crystal structures of many zeolites exhibit interstices of molecular dimensions. The interstitial spaces are generally occupied by water of hydration. Under proper conditions, viz., after at least partial dehydration, these zeolites may be utilized as efficient adsorbents whereby adsorbate molecules are retained within the interstitial spaces. Access to these channels is had by way of orifices in the crystal lattice. These openings limit the size and shape of the molecules that can be adsorbed. A separation of mixtures of foreign molecules based upon molecular dimensions, wherein certain molecules are adsorbed by the zeolite while others are refused, is therefore possible. It is this characteristic property of many crystalline zeolites that has led to their designation as "molecular sieves."

The preferred zeolite molecular sieves are those that have apparent pore sizes at least as large as the critical dimension of benzene, 6.6 Angstrom units, so as to permit adsorption and desorption of this molecule and its alkyl derivatives. Synthetic zeolites X, Y and L are satisfactory from this standpoint, as is the naturally occurring faujasite. Zeolite Y is preferred as it affords higher hydrodealkylation activities than the other enumerated large pore crystalline zeolites.

Zeolite X is a synthetic crystalline zeolitic molecular sieve which may be represented by the formula:

$$0.9\pm 0.2M_{2/n}O:Al_2O:2.5\pm 0.5SiO_2:yH_2O$$

wherein M represents a metal, particularly alkali and alkaline earth metals, (n) is the valence of M, and (y) may have any value up to about 8 depending on the identity of M and the degree of hydration of the crystalline zeolite. Sodium zeolite X has an apparent pore size of about 10 Angstrom units. Zeolite X, its X-ray diffraction pattern, its properties, and methods for its preparation are described in detail in U.S. Patent No. 2,882,244 issued April 14, 1959.

The chemical formula for zeolite Y expressed in terms of mole oxides may be written as:

$$0.9\pm 0.2Na_2O:Al_2O_3:WSiO_2:xH_2O$$

wherein W is a value greater than 3 up to about 6 and $x$ may be a value up to about 9.

Zeolite Y has a characteristic X-ray powder diffraction pattern which may be employed to identify zeolite Y. The X-ray diffraction data are shown in Table A. The values for the interplanar spacing, $d$, are expressed in Angstrom units. The relative intensity of the lines of the X-ray powder diffraction pattern are expressed as VS, very strong; S, strong; M, medium; W, weak; and VW, very weak.

Zeolite Y is described in copending application Ser. No. 109,487 filed May 12, 1961 in the name of D. W. Breck, now U.S. Patent 3,130,007. Zeolite L is more fully described in copending application Ser. No. 711,565 filed January 28, 1958 in the names of D. W. Breck and N. A. Acara, now abandoned. The descriptions therein are incorporated herein by reference.

TABLE A

*X-ray powder diffraction pattern for zeolite Y*

| hkl | $h^2+k^2+l^2$ | $d$ in A. | Intensity |
|---|---|---|---|
| 111 | 3 | 14.37–14.15 | VS. |
| 220 | 8 | 8.80–8.67 | M. |
| 311 | 11 | 7.50–7.39 | M. |
| 331 | 19 | 5.71–5.62 | S. |
| 333, 511 | 27 | 4.79–4.72 | M. |
| 440 | 32 | 4.46–4.33 | M. |
| 531 | 35 | 4.29–4.16 | W. |
| 600, 442 | 36 | 4.13–4.09 | W. |
| 620 | 40 | 3.93–3.88 | W. |
| 533 | 43 | 3.79–3.74 | S. |
| 631 | 46 | 3.66–3.62 | M. |
| 711, 551 | 51 | 3.48–3.43 | VW. |
| 642 | 56 | 3.33–3.28 | S. |
| 733 | 67 | 3.04–3.00 | M. |
| 822, 660 | 72 | 2.93–2.89 | M. |
| 751, 555 | 75 | 2.87–2.83 | S. |
| 840 | 80 | 2.78–2.74 | M. |
| 911, 753 | 83 | 2.73–2.69 | W. |
| 664 | 88 | 2.65–2.61 | M. |
| 844 | 96 | 2.54–2.50 | VW. |
| 10, 0, 0; 860 | 100 | 2.49 2.45 | VW. |
| 10, 2, 0; 862 | 104 | 2.44–2.40 | VW. |
| 10, 2, 2; 666 | 108 | 2.39–2.36 | M. |
| 10, 4, 0; 864 | 116 | 2.29–2.25 | VW. |
| 11, 1, 1; 775 | 123 | 2.24–2.21 | VW. |
| 880 | 128 | 2.20–2.17 | W. |
| 11, 3, 1; 971; 955 | 131 | 2.18–2.14 | VW. |
| 11, 3, 3; 973 | 139 | 2.11–2.08 | W. |
| 12, 0, 0; 884 | 144 | 2.07–2.04 | VW. |
| 11, 5, 2; 10, 7, 1; 10, 5, 5 | 150 | 2.03–2.00 | VW. |
| 10, 8, 2; 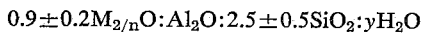 13, 1, 1; 11, 7, 1; 11, 5, 5; 993 | } 168, 171 | 1.92–1.89 | VW. |
| 13, 3, 1; 11, 7, 3; 977 | 179 | 1.86–1.83 | VW. |
| 13, 3, 3; 995 888 | } 187, 192 | 1.82–1.79 | VW. |
| 13, 5, 1; 11, 7, 5 | 195 | 1.78–1.76 | VW. |
| 14, 2, 0; 10, 10, 0; 10, 8, 6 | 200 | 1.76–1.73 | W. |
| 13, 5, 4; 11, 8, 5 | 210 | 1.71–1.69 | W. |

In producing zeolite Y, representative reactants are activated alumina, gamma alumina, alumina trihydrate and sodium aluminate as a source of alumina. Silica may be obtained from sodium silicate, silica gels, silicic acid, aqueous colloidal silica sols and reactive amorphous solid silicas. The latter two groups are preferred when zeolite Y products having molar $SiO_2/Al_2O_3$ ratios above about 4.5 are to be produced; however, these silica sources may if desired also be employed for making zeolite Y products having $SiO_2/Al_2O_3$ ratios of below about 4.5. The preparation of typical silica sols which are suitable for use in the process of the present invention are described in U.S. Patent No. 2,574,092 and U.S. Patent No. 2,597,872. Typical of the group of reactive amorphous solid silicas, preferably having an ultimate particle size of less than 1 micron(s) are such materials as fume silicas, chemically precipitated silicas, and precipitated silica sols, and including silicas such as those known by such trade names as "Santocel," "Cab-o-sil," "Hi-Sil," and "QUSOS." Finely divided "Vycor" glass powder may also be used. Sodium hydroxide may supply the sodium ion and also assist in controlling pH.

When an aqueous colloidal silica sol or a reactive amorphous solid silica is employed as the major source of silica, zeolite Y may be prepared by preparing an aqueous sodium aluminosilicate mixture having a composition, expressed in terms of oxide-mole-ratios, which falls within one of the ranges shown in Table B.

TABLE B

|  | Range 1 | Range 2 | Range 3 |
|---|---|---|---|
| $Na_2O/SiO_2$ | 0.20 to 0.40 | 0.41 to 0.60 | 0.61 to 0.80 |
| $SiO_2/Al_2O_3$ | 10 to 40 | 10 to 30 | 7 to 30 |
| $H_2O/Na_2O$ | 25 to 60 | 20 to 60 | 20 to 60 | maintaining the mixture at a temperature in the range of from about 20° C. to 125° C. until crystals are formed, and separating the crystals from the mother liquor.

The preferred composition range for producing sodium zeolite Y when the major source of silica is an aqueous colloidal silica sol or a reactive amorphous solid silica expressed in terms of oxide-mole-ratios, is shown in Table C.

TABLE C

|  | Range 4 |
|---|---|
| $Na_2O/SiO_2$ | 0.4 to 0.6 |
| $SiO_2/Al_2O_3$ | 15 to 25 |
| $H_2O/Na_2O$ | 20 to 50 |

The crystallization is most satisfactorily effected at a temperature of from about 80° C. to 125° C. At lower temperatures, the crystals which form are smaller in size than those formed at the higher temperature.

When silica sources such as sodium silicate, silica gels or silicic acid are employed as the major source of silica, zeolite Y may be prepared by preparing an aqueous sodium aluminosilicate mixture having a composition, expressed in terms of oxide-mole-ratios, falling within any one of the ranges shown in Table D.

TABLE D

|  | Range 5 | Range 6 | Range 7 |
|---|---|---|---|
| $Na_2O/SiO_2$ | 0.6 to 1.0 | 1.5 to 1.7 | 1.9 to 2.1 |
| $SiO_2/Al_2O_3$ | 8 to 30 | 10 to 30 | About 10 |
| $H_2O/Na_2O$ | 12 to 90 | 20 to 90 | 40 to 90 |

The preferred compositions for preparing zeolite Y from sodium silicate, silica gels or silicic acid are shown in Table E.

TABLE E

|  | Range 8 | Range 9 |
|---|---|---|
| $Na_2O/SiO_2$ | 0.70 to 0.90 | 1.5 to 1.7 |
| $SiO_2/Al_2O_3$ | 10 to 25 | 10 to 20 |
| $H_2O/Na_2O$ | 12 to 90 | 20 to 90 |

The crystallization is conducted by holding the reaction mixture in the temperature range of about 20° C. to 125° C. until the crystalline product is obtained. In this range it is preferred to use temperatures from about 80° C. to 125° C.

In general the lower temperatures may require crystallization times somewhat longer than is usually considered desirable in commercial practice. The zeolite Y product obtained at these lower temperatures may tend toward particle sizes smaller than those of the zeolite Y products prepared at the higher temperatures.

When silica sources such as sodium silicate, silica gel or silicic acid are used as the major source of silica in the aqueous sodium aluminosilicate mixture as hereinbefore described, the zeolite Y compositions as prepared usually have silica/alumina ($SiO_2/Al_2O_3$) ratios ranging from greater than 3 up to about 3.9. In this range the unit cell constant, $a_0$, of the crystals changes from 24.87 to 24.77 A. When zeolite Y compositions having silica/alumina ratios above about 3.9 are desired, silicate sources such as the aqueous colloidal silica sols and the reactive amorphous solid silicas are preferably as the major source of silica in the aqueous sodium aluminosilicate mixtures as hereinbefore set forth.

When substantially pure sodium zeolite Y compositions having a product silica-to-alumina mole ratio up to about 6 are desired, they may be prepared from reactant mixtures, wherein an aqueous colloidal silica sol or a reactive amorphous solid silica is employed as the major source of silica, which fall within one of the following ranges:

Range 10:

$Na_2O/SiO_2=0.28-0.30$
$SiO_2/Al_2O_3=8-10$
$H_2O/Na_2O=30-50$

Range 11:

$Na_2O/SiO_2=$about 0.4
$SiO_2/Al_2O_3=10-27$
$H_2O/Na_2O=30-50$

The reactant mixture is first digested at ambient or room temperature and then heated to an elevated temperature and maintained at this elevated temperature until sodium zeolite Y having the higher silica-to-alumina molar ratio has crystallized. Ambient temperature, as used herein, means the air temperature normally encountered in a plant designed for the production of sodium zeolite Y, namely, from about 55° F. to about 100° F.

It has been discovered that the hydrodealkylation activity of the zeolitic molecular sieve based on catalysts of this invention is related to (1) the identity of the active elemental metal; (2) the fine dispersion of the elemental metal within the molecular sieve inner cagework, obtainable by ion exchange; (3) the method used in activating the metal-loaded material prior to use as a hydrodealkylation catalyst; (4) extent of decationization; (5) crystallinity of the molecular sieve; (6) pore size of the molecular sieve; and (7) cation valency and silica-to-alumina ratio of the molecular sieve structure. Each of these factors will be discussed herein.

The metal-loaded zeolite after thorough washing to remove soluble inorganic salts is converted by compression into shapes suitable for use in fixed bed type reactors. This is done without inert binders or lubricants, but these forming aides may be used without modification of the catalyst activity. Similarly, the metal-loaded zeolite powder can be used without compression into particular forms in certain applications; for example, in fluidbed catalytic reactors.

According to the present invention, the molecular sieve catalysts used herein have an active elemental metal finely dispersed within the inner adsorption region of the molecular sieve. The active elemental metal is selected from the group consisting of copper, cadmium, tin, lead, antimony, bismuth, mercury, gold and Group VIII of the Periodic Table. As used herein, Group VIII includes the iron group consisting of iron, cobalt and nickel, the palladium group consisting of ruthenium, rhodium and palladium, and the platinum group consisting of osmium, iridium and platinum. All of these metals may be introduced through the uniformly sized pores into the inner cagework of the molecular sieve by ion exchange techniques. Certain of the enumerated metals may be provided in the form of the cationic portion of simple soluble salts in aqueous solutions as for example $CuSO_4$ and $NiCl_2$, ion exchanged with a portion of the zeolitic structural cations, and the exchanged metal cations reduced to the elemental form, preferably in an atmosphere of hydrogen by heating to 300–600° C. Prior to the reduction, it is preferred that the zeolite be dehydrated by suitable means such as heating to 350–550° C. under vacuum or in a purge of dry air or inert gas. This procedure is described more completely in copending application Serial No. 862,990, filed December 30, 1959 in the name of Jule A. Rabo et al., now abandoned, incorporated herein to the extent pertinent.

Certain of the above-mentioned metals are preferably dispersed within the molecular sieve inner adsorption region by providing the metal as a portion of a co-ordination complex cationic salt in an aqueous solution, as for example a metal amine complex salt. Illustrations of this type of compound are tetrammine platinum (II), tris-ethylenediamine platinum (IV) and tetrammine palladium (II). It has been found that it is necessary to convert these cations to the elemental metals by heating to temperatures of 300–500° C., preferably of 300–350° C. in an oxygen-containing atmosphere prior to heating in the reducing atmosphere of the hydrodealkylation reaction. Heating in $H_2$ at atmospheric pressure before introduction of the hydrocarbon feed is particularly necessary, if after the activation in the oxygen-containing atmosphere, the metal-containing zeolites are allowed to cool and adsorb water vapor. It is preferred that the catalysts are not rehydrated after decomposition of the co-ordination complex cations.

As previously indicated, the elemental metal must be finely dispersed within the inner adsorption region of the molecular sieve for high hydrodealkylation catalytic activity. It has been discovered that such minute internal dispersion can only be achieved by ion exchange. That is, a statistical dispersion of the active metal cations is obtained by slowly adding very dilute solutions of the exchanging cations to a dilute, rapidly stirred slurry of the zeolite followed by a time interval for equilibration. This is illustrated by the data of Table I, which shows that the catalytic activity of crystalline large-pore zeolites loaded with active metals by ion exchange is considerably greater than similar catalysts impregnated with active metals. In all tests the hydrodealkylation conditions were 450° C. and 1.9 atmospheres $H_2$ pressure. The reason for the great difference in hydrodealkylation activity is due to the fact that the impregnated metal only resides on the outer surface of the molecular sieve, and does not pass through the uniform pores to the inner cagework. As the outer surface has one about 1% of the area possessed by the inner region, the metal is not finely dispersed and the hydrodealkylation catalytic activity is severely limited.

TABLE I

*Effect of the method of metal-loading and catalyst activation procedures on hydrodealkylation activity*

| Catalyst: | Percent benzene in aromatic fraction |
|---|---|
| 0.5 wt.–percent Pt on NaY zeolite—by impregnation—activated in air at 350° C., rehydrated and reactivated in $H_2$ at 550° C. | 14 |
| 0.5 wt.–percent Pt on NaY zeolite—by ion exchange as Pt $(NH_3)_4^{+2}$ or Pt $(en)_3^{+4}$—activated in air at 300–550° C., rehydrated and reactivated in $H_2$ at 550° C. | ¹68 |
| 0.5 wt.–percent Pd on NaY zeolite—by ion exchange as Pd $(NH_3)_4^{+2}$ ion: | |
| (1) Activated in $H_2$ at 550° C.—no rehydration | 0 |
| (2) Activated in air at 350° C., and $H_2$ at 550° C.—no rehydration | 73 |
| (3) Activated in air at 250° C., rehydrated and reactivated in $H_2$ at 550° C. | 5 |

¹ Average from 5 separate catalyst evaluations.

The molecular sieve catalysts of this invention have more than about 92 percent of the aluminum atoms associated with cations. That is, the zeolite is less than about 8% decationized. As used herein, the term "decationized" relates to that unique condition whereby aluminum atoms of the alumino-silicate structure of the molecular sieve are not associated with cations. As previously described, the active metal is originally introduced in cationic form by ion exchange with a portion of the structural cations, e.g. sodium in sodium zeolite X and calcium in calcium zeolite X. The ion exchanged structural metal cations are then reduced to the elemental form, and replaced by hydrogen ions in the molecular sieve framework. Thereafter the elemental metal-loaded hydrogen cation containing zeolite catalyst is heated to the desired hydrodealkylation temperature of at least 400° C., and decationization is effected by destruction of the hydrogen cations. The metal cation reduction and the decationization may in some instances proceed simultaneously.

Synthetic zeolites are crystallized from strongly alkaline aqueous reactant mixtures and are recovered by filtration followed by water washing to remove substantially all of the mother liquor. This washing effects removal of some of the alkali metal cation constituent and replacement thereof with hydrogen cations. The extent of this cation interchange is probably dependent upon the extent of the washing in combination with other factors such as temperature, crystal size, alkalinity of the residual mother liquor, and the like.

Molecular sieves with substantial alkali metal cation deficiencies after synthesis and washing are preferably reconstituted to a full complement of alkali metal cations, e.g., each cation exchange site $(AlO_4^-)$ in the zeolite occupied by an alkali metal, preferably sodium. This may be readily accomplished by replacing the hydrogen at cation-containing sites with ion-exchanging alkali metal from appropriate solutions. Solutions of alkali metal salts of strong and weak acids are suitable for this purpose as well as caustic solutions. It is preferred that the major amount of the hydrogen cations be replaced by exchange from salt solutions, followed by washing with dilute caustic solutions to effect removal of excess alkali metal salt and complete reconstitution. Small amounts of residual caustic are not detrimental. Hydrogen-containing cation sites not reconstituted when heated to the desired hydrodealkylation temperatures of at least 400° C. are decationized by destruction of the hydrogen cations. For this reason the cation deficient zeolite should not be strongly heated prior to reconstitution.

The decationized forms of molecular sieve zeolites provide an activity that occurs through a carbonium ion-type mechanism. Such ionic activity leads to transalkylation of alkyl substituted aromatics. It has been found that transalkylation may be minimized if the catalyst is less than 8% decationized.

As described above, decationization results on reduction of active metal cations incorporated into the zeolite by ion exchange of the alkali metal cations. To maintain the extent of decationization occurring by this method below 8%, it is necessary to limit the amount of active metal employed to a quantity such that less than 16% of the zeolite cations are ion exchanged during metal loading. About 50% of the sites decationized by reduction of the metal cation at elevated temperatures, may be reconstituted with alkali metal cations using the same ion exchange techniques described above for reconstituting zeolites which are cation deficient after synthesis.

It should be understood that the 8% decationization limitation is the sum aggregate from any or all decationization mechanisms. That is, the decationization may result from either or both the zeolite synthesis and the metal cation reduction.

A wide range of feed stocks can be used in this invention provided the constituents can be absorbed and desorbed from the catalyst surface and pore system. The methyl group is the most difficult to remove from the aromatic nuclei. Larger groups are readily removed directly, or first converted to methyl substituents and then demethylated. Paraffinic and naphthenic constituents may be dehydrogenated at the active metal sites, increasing the overall yield of aromatics. During the process the unconverted nonaromatic constituents are cracked to low molecular weight compounds which are easily separated from the aromatic fraction, effecting a purification of the aromatic fraction. Low cost tar-acids containing cresol constituents may be dimethylated by the present invention, with unsubstituted phenol as the valuable product.

It will be noted that the ensuing data all involves toluene feed. However, since the methyl group on an aromatic ring is the most difficult to remove, it can be assumed that the present zeolitic molecular sieve catalysts would be highly effective for the hydrodealkylation of higher molecular weight single- or poly-substituted aromatics.

As previously noted, sodium is the preferred cation of the basic crystalline zeolite structure and provides the most active hydrodealkylation catalyst. This was clearly illustrated by a series of tests in which various crystalline zeolitic molecular sieves having various cation compositions were used as catalysts for the hydrodealkylation of toluene. The methods of preparation and activation as well as the reaction conditions were the same for each catalysts, and they all contained 0.5% by weight, finely dispersed platinum metal. The reaction conditions were 550° C., 450 p.s.i.g. a hydrogen to hydrocarbon molar ratio of 10:1, and a weight-hourly-space-velocity (W.H.S.V.) of one gram of feed per gram catalyst per hour. The results of these tests are reported in Table II.

TABLE II

*Effect of Group IA cation on hydrodealkylation activity*

| Catalyst | | Liquid product analyses* (mol-percent) | | | |
|---|---|---|---|---|---|
| Zeolite | Cation distribution, percent of total | Benzene | Toluene | Xylenes | $C_1$–$C_3$ products |
| X | Na-100 | 29.9 | 67.4 | 0.0 | 2.6 |
| Y | Na-100 | 30.9 | 65.6 | 0.0 | 3.5 |
| Y | Na-2+K-98 | 6.3 | 93.4 | 0.0 | 0.4 |
| Y | Na-33+Li-65 | 20.6 | 72.7 | 0.0 | 2.7 |

*Collected at Dry Ice temperature and stabilized at 0° C.

Crystallinity of the zeolite is necessary for catalytic activity. An amorphous zeolite of the Permutit type with approximately the same chemical composition as the crystalline Type Y zeolite, was found to have very little activity in comparison to the crystalline zeolites of the present invention. Similarly, the pore size of the crystalline zeolites is important. The crystalline Type T zeolite with a uniform pore size of less than 6.6 A. does not permit toluene feed to enter the internal pore system. Zeolite T is described in U.S. Patent No. 2,950,952 issued August 30, 1960 to D. W. Breck et al. The activity of this zeolite in hydrodealkylation was poor, indicating a certain minimum pore size has to be exceeded. The importance of the crystallinity and pore size of the zeolite in the practice of this invention was illustrated by another series of tests in which small amounts of pure toluene were contacted at 450° C. in a stream of $H_2$ at 1.9 atmospheres total pressure with various catalyst materials. The results of these tests are reported in Table III, the data being obtained in a microcatalytic reactor attached to a vapor chromatographic analyzer.

TABLE III

*Effect of zeolite crystallinity and pore size on dealkylation activity*

| Catalyst: | Percent benzene in aromatic fraction |
|---|---|
| 0.5 wt.–percent Pt on Type Na Y | 68 |
| 0.5 wt.–percent Pt on Type Na X | 39 |
| 0.5 wt.–percent Pt on Type Na T | 5 |
| 0.5 wt.–percent Pt on Type amorphous zeolite ($Na^+$ form) | 7 |

In the Table III tests, the aromatic fraction consisted solely of benzene and toluene. No xylenes or heavier hydrocarbons were formed. The lighter hydrocarbon cracked products were more than 95 mole-percent methane. It can be readily seen from a study of this data that the hydrodealkylation activity attainable by the instant process represents at least a five-fold improvement on the use of other zeolitic materials.

In summary, one embodiment of the present invention contemplates a process for the hydrodealkylation of alkyl-substituted aromatic hydrocarbons in which the hydrocarbon feed is contacted in a hydrogen atmosphere at temperatures between 400 and 650° C. with an activated metal cationic crystalline aluminosilicate zeolite molecular sieve material having (1) an apparent pore size of at least about 6.6 Angstrom units; (2) more than about 92 percent of the aluminum atoms associated with cations; (3) a monovalent metal cation when the silica-to-alumina molar ratio is greater than about 3; and (4) an active elemental metal selected from the group consisting of copper, cadmium, tin, lead, antimony, bismuth, mercury, gold, and Group VIII of the Periodic Table, the metal being finely dispersed with the inner adsorption region of the molecular sieve.

The following examples illustrate the catalyst syntheses and activation procedures:

EXAMPLE I—PREPARATION OF A 0.5 WT.–PERCENT Pt—CONTAINING TYPE Na Y ZEOLITE

In a 5 l. flask equipped with a mechanical stirrer and dropping funnel, was charged 1 l. of distilled water and 540 g. of Type Y zeolite of the following composition: $Na_2O$, 9.5%; $Al_2O_3$, 16.4%; $SiO_2$, 48.3% and $H_2O$ (loss on ignition at 750° C.), 25.6%; $SiO_2$:$Al_2O_3$ molar ratio=5.0:$Na_2O$:$Al_2O_3$ ratio=0.95. To the stirred slurry was charged from the dropping funned a solution of 3.60 grams $Pt(NH_3)_4Cl_2.H_2O$ (2.00 grams of Pt) dissolved in 1400 ml. of distilled water over a period of 2–2.5 hours. Stirring was continued for two hours after addition was complete. The slurry was filtered with suction and the exchanged zeolite washed by reslurrying and filtering twice with 600 ml. portions of distilled water. The washed powder was dried in an oven at 120° C.–130° C. and converted into tablets $\frac{3}{16}''$ in diameter by $\frac{1}{8}''$ thick. The bulk density of the tablets was 0.6–0.7 grams/cc. and the Pt content 0.5 wt.–percent on an anhydrous basis (loss on ignition at 750° C.).

EXAMPLE II.—ACTIVATION IN AIR OF A $Pt(NH_3)_4^{+2}$ EXCHANGED TYPE Na Y ZEOLITE

A 140 cc. quantity of the tablets prepared as in Example I were placed in a glass tube in a split tube furnace. A purge of dry air at 75–80 ft.³/hour was passed over the tablets as they were heated from room temperature to 350° C. in one hour or longer, and held at this temperature for an additional 2–6 hours. The activated tablets were a uniform light-grey in color. They were cooled and exposed to the atmosphere for 16–20 hours to rehydrate to 23.5 wt.–percent $H_2O$. The activated tablets could be transferred directly to the hydrodealkylation reactor or the activation could be accomplished in situ in the reactor provided the air purge and temperature program is followed.

EXAMPLE III—ACTIVATION IN $H_2$

A quantity of the air activated tablets prepared as in Example II was placed in a stainless steel, flow-type reactor furnished with preheat and postheat sections of $3/16''$ stainless steel balls. A purge of dry, $O_2$-free $H_2$ at 5 ft.$^3$/hour was passed through the reactor at atmospheric pressure as the temperature was raised as follows: to 150° C. and held for 2 hours, to 350° C. and held for 2 hours and finally to 500° C. and held for 2 hours or longer. The hydrogen pressure and temperature were raised to the desired level before introduction of the hydrocarbon feed.

EXAMPLE IV

The following data illustrate the effects of process variables and the utility of the process and catalysts. The catalyst was prepared as described in Examples I, II, and III. The hydrocarbon feed was pure toluene.

| | | | | | | |
|---|---|---|---|---|---|---|
| Temp., ° C | 550 | 550 | 550 | 550 | 550 | 550 |
| Press., p.s.i.g | 450 | 450 | 450 | 50 | 50 | 50 |
| W.H.S.V., g./g./hr | 1.0 | 0.5 | 2.0 | 2.0 | 1.0 | 0.5 |
| $H_2$:H.C. molar ratio | 10 | 20 | 5 | 5 | 10 | 20 |
| Time on stream (hours) | 4 | 24 | 26 | 63 | 81 | 84 |
| Liquid product analysis* (mol-percent): | | | | | | |
| Benzene | 30.9 | 36.6 | 14.3 | 27.3 | 39.6 | 51.8 |
| Toluene | 65.6 | 60.1 | 84.6 | 72.7 | 60.4 | 48.2 |
| Xylenes | 0 | 0 | 0 | 0 | 0 | 0 |
| Cracked products | 3.5 | 3.4 | 1.2 | 0 | 0 | 0 |

*Collected at Dry Ice temperature and stabilized at 0 ° C.

EXAMPLE V

This example illustrates the long life of the catalyst and the effect of reaction temperature. The catalyst was prepared as described in Examples I, II, and III. The hydrocarbon feed was pure toluene.

| | | | | | | | |
|---|---|---|---|---|---|---|---|
| Temp., ° C | 525 | 550 | 575 | 600 | 550 | 550 | 575 |
| Press., p.s.i.g | 450 | 450 | 450 | 450 | 450 | 450 | 450 |
| W.H.S.V., g./g./hr | 0.5 | 0.5 | 0.5 | 0.5 | 0.5 | 0.5 | 0.5 |
| $H_2$:H.C. molar ratio | 20 | 20 | 20 | 20 | 20 | 20 | 20 |
| Hours on stream | 4 | 26 | 30 | 32 | 79 | 291 | 341 |
| Percent benzene in liquid product | 15.2 | 33.1 | 67.1 | 79.4 | 35.2 | 29.0 | 50.1 |

The catalyst at the end of the run contained less than 1.5 wt.-percent coke and had a surface area ($N_2$-Brunnauer, Emmett and Teller Method) of 570 M.$^2$/g. The surface area at the start was also 570 M.$^2$/g.

EXAMPLE VI

The following data illustrate the hydrodealkylation activity at atmospheric pressure for toluene and alkyl-substituted aromatic hydrocarbons other than pure toluene. The catalyst was prepared as described in Examples I, II, and III. The reaction conditions were:

Temp., ° C. _____ 550
Press. _____ atmosphere
W.H.S.V., g./g./hr. _____ 1.0
$H_2$:H.C. molar ratio _____ 5

| Feed | Toluene | Xylene | Ethylbenzene | Meta-cresol |
|---|---|---|---|---|
| Product composition mol-percent: | | | | |
| Benzene | 64 | 32 | 57 | 2-3 |
| Toluene | 36 | 33 | 41 | 2-3 |
| Xylene | 0 | 35 | 0 | |
| Ethylene benzene | | | 2 | |
| Phenol | | | | 7 |
| Meta-cresol | | | | 86-89 |

The following data were obtained with an impure toluene feed at the above process conditions:

| Component | Percent in feed | Percent in product |
|---|---|---|
| Benzene | 0 | 75.5 |
| Toluene | 86.8 | 24.5 |
| Xylenes | 3.7 | 0 |
| Styrenes | 7.3 | 0 |
| Others | 2.3 | Traces |

EXAMPLE VII

The following data illustrates the previously described factors of cation polyvalency and silica-to-aluminum ratio of the molecular sieve catalyst material, the feed being toluene.

| Catalyst: | | | |
|---|---|---|---|
| Zeolite | X | Y | Y |
| Cation | *Ca | Na | *Ca |
| Product composition, mole-percent: | | | |
| Benzene | 18.1 | 30.9 | 22.2 |
| Toluene | 79.4 | 65.6 | 63.7 |
| Xylene | 0.0 | 0.0 | 11.3 |
| Cracked products | 2.7 | 3.5 | 2.8 |

*Greater than 75% of the sodium cations replaced by calcium.
[Process conditions: Temp., 550° C.; Press., 450 p.s.i.g.; W.H.S.V., 1.0 g./g./hr.; $H_2$:H.C. molar ratio, 10]

An inspection of this data reveals that no transalkylation occurred when CaX and NaY zeolite catalysts were employed, whereas considerable transalkylation resulted when CaY zeolite was used. It will be recalled that zeolite Y has a silica-to-alumina ratio of greater than 3, and consequently should not be used in the polyvalent cationic form, e.g. CaY, for hydrodealkylation in view of the ionic activity.

The previously described experiments have involved elemental platinum and palladium-containing zeolites, but excellent results have also been obtained with nickel and copper loaded crystalline zeolites. The ensuing data illustrates the suitability of these materials, and in particular the preferred catalysts, elemental copper containing, sodium cationic zeolite Y and elemental nickel containing, sodium cationic zeolite Y.

In Tables IV–VII, certain terms are used to describe catalytic activities. These are: (1) conversion, as 100 minus the moles of toluene in the product per mole of toluene feed, (2) molar selectivity of the conversion, (a) to benzene, as moles of benzene produced per mole of toluene converted, (b) to xylenes, as moles of xylene product per mole of toluene converted, and (c) to non-aromatics as 100—(to benzene+to xylenes). Referring now to Table IV, it will be seen that additional tests have been made with 0.5 wt.-percent platinum loaded sodium zeolite Y, and that there are differences between this data and that of Table I–III. Some degree of transalkylation activity as indicated by the xylene product was observed in the Table IV tests whereas no such activity was observed in the Table I–III tests. A probable explanation is that the Table IV catalyst materials have a relatively large cation deficiency, i.e. the $Na_2O$:$Al_2O_3$ molar ratio is less than 0.92–1.0, generally between 0.90 and 0.80. This substantial decationization is due to excessive water washing of the crystalline zeolite thereby cation exchanging sodium for hydrogen, the latter being destroyed by the activation at elevated temperature. In all probability, protons initially balance the negative charge on the $AlO_4^-$ tetrahedra of the structure which are not associated with a sodium cation and the sites are still ion exchangeable. As previously discussed, these sites are decationized on activation of metal-loaded zeolites, which in turn produces the ionic type catalytic activity evidenced by transalkylation. Additional decationization occurs when the metal cations are reduced to the elemental forms, and the amount is proportional to the weight loading (extent of ion exchange) employed. Such decationized sites formed on the high temperature reduction of the metal cations (i.e., the $AlO_4^-$ no longer has a metal cation associated with them) may also have ionic type catalytic activity. The degree of decationization at constant weight percent metal loading is proportional to the atomic weight of the metal. For instance, a 0.5 wt.–percent loading of copper (atomic weight 63.5) require approximately 4% ion exchange with $Cu^{+2}$ cation; for platinum (atomic weight 195) approximately 1% exchange with $Pt(NH_3)_4^{+2}$ cation in a 5.0 $SiO_2/Al_2O_3$ crystalline zeolite.

A comparison of the effect of the weight percent metal loading on the hydrodealkylation activity of Cu-loaded, zeolite Y at various reaction temperatures is given in Table IV. Comparative data are also given for 1.0 wt.–percent Cu-loaded sodium X zeolite and 0.5 wt.–percent Pt-loaded, sodium Y zeolite. These data show that the 0.5 wt.–percent Cu-loaded NaY catalyst was somewhat more active than the similar Pt catalyst and about three times more selective, i.e., greater retention of aromatics. The preferred Cu loading on the Type Y zeolite is about 1–2% for optimum activity-selectivity. Higher loadings give more activity, and may be useful for certain feeds, but considerably lower selectively. Lower metal loading gives less hydrodealkylation activity but about the same ionic activity as evidenced by the amount of transalkylation and conversion to non-aromatics. Higher reaction temperatures result in better activity-selectivity relationships, at least in the temperature ranges employed. The reason for this is that both the transalkylation reaction and the ring-hydrogenation reaction are less thermodynamically favored at the higher temperatures. A temperature of about 650° C. however, is the upper limit.

The data in Table IV also show that the 1.0 wt.–percent Cu-loaded sodium X zeolite is an effective hydrodealkylation catalyst. However, approximately a 50° C. higher reaction temperature is required to yield the same conversion level obtained with similar Type Y catalysts. The transalkylation product, xylene, obtained with the Type X catalyst is almost negligible, demonstrating the importance of having at least about 92% cation sufficiency.

In Table V, activity data are given for a 1.0 wt.–percent Ni-loaded sodium Y. The cation deficiency and decationization resulting from reduction of the 1.0 wt.–percent $Ni^{+2}$ cations were approximately the same as with the 1.0 wt.–percent Cu-loaded Type Y catalyst. The data in Table V show that the nickel-loaded Type Y catalyst is somewhat more active than the copper catalyst in that approximately the same conversion of the toluene feed was achieved at a 20° C. lower reaction temperature. The transalkylation activity, stability and the selectivity of the two catalysts were about the same.

Table VI shows toluene hydrodealkylation data using 2.0 wt.–percent Ni-loaded sodium Y catalyst, and may be compared with the 1.0 wt.–percent Ni-loaded sodium Y data of Table V. It will be apparent that the two catalysts have essentially the same activity and transalkylation is higher with the material of greater nickel content. This is undoubtedly due to the increase in amount of decationization. It can also be seen that best results in terms of benzene selectivity were obtained with a space velocity of about 1 gram feed per gram of molecular sieve catalyst per hour.

Although preferred embodiments have been described in detail, it is contemplated that modifications of the process may be made and that some features may be employed without others, all within the spirit and scope of the invention as set forth herein.

TABLE IV

Comparison of the hydrodealkylation activity of various metal-loaded large pore crystalline zeolites. Effect of Cu loading on catalytic activity

| Catalyst: | | | | | | | | | |
|---|---|---|---|---|---|---|---|---|---|
| Type of zeolite | Y | | Y | | Y | | Y | | X |
| $SiO_2$: $Al_2O_3$ molar ratio | 4.9 | | 5.1 | | 5.1 | | 5.0 | | 2.3 |
| Active metal | Pt | | Cu | | Cu | | Cu | | Cu |
| Active metal, wt.-percent | 0.5 | | 0.5 | | 1.0 | | 4.3 | | 1.0 |
| Cation deficiency of support, percent of total sites | ~10 | | 9 | | 9 | | 9 | | <5 |
| Cation deficiency from metal loading, percent of total sites | ~1 | | 3.5 | | 7 | | 30 | | 2.5 |
| Total percent decationization | ~10 | | 13 | | 16 | | 39 | | <8 |
| Process conditions: | | | | | | | | | |
| Equilibrium temp., °C | 570 | 550 | 570 | 550 | 570 | 550 | 570 | 570 | 590 |
| Pressure, p.s.i.g | 450 | 450 | 450 | 450 | 450 | 450 | 450 | 450 | 450 |
| W.H.S.V., g./g./hr | 1.0 | 1.0 | 1.0 | 1.0 | 1.0 | 1.0 | 1.0 | 1.0 | 1.0 |
| $H_2$:H.C., molar | 10 | 10 | 10 | 10 | 10 | 10 | 10 | 10 | 10 |
| Hours on stream | 189 | 30 | 94 | 34 | 84 | 72 | 124 | 20 | 39 |
| Liquid yield, wt.-percent, vol.-percent | 85 | 95.0 | 92 | 90 | 89 | 77 | 76 | 97 | 92 |
| Conversion | 31.0 | 23.4 | 37.5 | 41.0 | 46.4 | 50.5 | 53.6 | 14.9 | 28.2 |
| Molar selectivity: | | | | | | | | | |
| To benzene | 44.9 | 47.7 | 56.4 | 69.0 | 72.4 | 43.5 | 47.0 | 94.6 | 79.3 |
| To xylenes | 4.5 | 31.1 | 26.4 | 15.0 | 12.9 | 14.8 | 12.7 | Trace | 2.0 |
| To non-aromatics | 50.6 | 19.2 | 17.2 | 16.0 | 14.7 | 41.7 | 40.3 | 5.4 | 20.6 |

TABLE V

Toluene dealkylation activity of 1.0 wt.-percent Ni-loaded sodium Y zeolite

| Catalyst | 1.0 wt. percent Ni-Na-Y zeolite (5.1 $SiO_2$:$Al_2O_3$ Ratio) | | | | |
|---|---|---|---|---|---|
| Feed | Toluene | Toluene | Toluene | Toluene | Toluene |
| Temp., °C.—Inlet | 550 | 550 | 570 | 570 | 570 |
| Pressure, p.s.i.g | 450 | 450 | 450 | 450 | 450 |
| $H_2$:H.C., molar | 10:1 | 10:1 | 10:1 | 10:1 | 10:1 |
| W.H.S.V., g./g./hr | 1.0 | 1.0 | 1.0 | 1.0 | 1.0 |
| Hours on stream | 3.0 | 61 | 67 | 119 | 166 |
| Liquid recovery: | | | | | |
| Vol. percent | 82.0 | 87.1 | 86.2 | 86.0 | 86.1 |
| Wt. percent | 82.2 | 87.4 | 86.2 | 86.1 | 86.2 |
| Conversion | 55.6 | 47.8 | 57.6 | 48.6 | 45.1 |
| Molar Selectivity: | | | | | |
| To benzene | 66.3 | 61.6 | 77.6 | 67.9 | 67.7 |
| To xylenes | 10.2 | 18.6 | 10.1 | 12.0 | 10.4 |
| To non-aromatics | 23.5 | 19.8 | 22.3 | 20.2 | 22.0 |

TABLE VI

*Hydrodealkylation of toluene with 2.0 wt.-percent Ni-loaded sodium Y zeolite catalyst: effect of space velocity*

|  |  |  |  |  |
|---|---|---|---|---|
| Average Temperature for Run, °C | 560 | 583 | 582 | 582 |
| Pressure, p.s.i.g | 450 | 450 | 450 | 450 |
| H₂:H.C | 10/1 | 10/1 | 10/1 | 10/1 |
| W.H.S.V | 1.0 | 1.0 | 2.0 | 0.5 |
| Hours on stream | 68.0 | 123 | 139 | 145 |
| Liquid yield, vol. percent | 89.0 | 87.5 | 92.0 | 75.3 |
| Liquid yield, wt. percent | 89.3 | 87.9 | 92.2 | 75.7 |
| Conversion | 40.8 | 41.5 | 25.5 | 60.6 |
| Molar selectivity to— |  |  |  |  |
| Benzene | 52.8 | 59.8 | 56.6 | 54.4 |
| Xylenes | 23.4 | 16.8 | 18.8 | 11.6 |
| Non-aromatics | 23.8 | 23.4 | 24.6 | 34.1 |

What is claimed is:

1. A process for the hydrodealkylation of alkyl-substituted aromatic hydrocarbons comprising the steps of providing an alkyl-substituted aromatic hydrocarbon feed and contacting such hydrocarbon in a hydrogen atmosphere at temperatures between about 400 and 650° C. with an activated metal cationic crystalline aluminosilicate zeolitic molecular sieve material having:
    (1) an apparent pore size of at least about 6.6 Angstrom units;
    (2) more than about 92 percent of the aluminum atoms associated with cations;
    (3) a monovalent metal cation when the silica-to-alumina molar ratio is greater than 3; and
    (4) an active elemental metal selected from the group consisting of copper, cadmium, tin, lead, antimony, bismuth, mercury, gold and Group VIII of the Periodic Table, being finely dispersed within the inner adsorption region of the molecular sieve.

2. A process according to claim 1 in which said active elemental metal constitutes between about 0.01 and 2.0 weight percent of the sieve.

3. A process according to claim 1 in which the hydrodealkylation pressure is between about 50 and 600 p.s.i.g.

4. A process according to claim 1 in which the activated crystalline zeolitic molecular sieve is a member selected from the group consisting of zeolite X, zeolite Y, zeolite L and faujasite.

5. A process according to claim 1 in which the weight-hourly-space-velocity of said alkyl-substituted aromatic hydrocarbon feed is about 0.5 to 2.0 grams feed per gram molecular sieve per hour.

6. A process according to claim 1 in which the hydrogen to hydrocarbon feed molar ratio is between about 1 and 20.

7. A process according to claim 1 in which the hydrogen to hydrocarbon feed molar ratio is about 5–15.

8. A process according to claim 1 in which said active elemental metal is dispersed in the zeolitic molecular sieve prior to contacting the hydrocarbon feed by ion exchanging a portion of the zeolite cations with the desired quantity of active metal cations, and converting such exchanged active metal cations to the elemental metal form.

9. A process according to claim 1 in which said active elemental metal is dispersed in the zeolitic molecular sieve prior to contacting the hydrocarbon feed by providing an aqueous solution of a salt of such metal of which the metal is in the cationic portion, contacting said aqueous solution with said zeolitic molecular sieve thereby ion-exchanging a portion of the zeolite cations with the active metal cations, and thereafter reducing the active metal cations to the elemental form.

10. A process according to claim 9 in which the reduction of said active metal cations is at a temperature of between about 300° C. and 600° C. and in a hydrogen atmosphere.

11. A process according to claim 1 in which said active elemental metal is dispersed in the zeolitic molecular sieve prior to contacting the hydrocarbon feed by ion exchanging as a co-ordination complex cation with a portion of the zeolite cations and thereafter reducing the co-ordination complex to the elemental metal.

12. A process according to claim 1 in which copper is the elemental metal.

13. A process according to claim 1 in which nickel is the elemental metal.

14. A process according to claim 1 in which platinum is the elemental metal and sodium cationic zeolite Y is the molecular sieve.

15. A process according to claim 1 in which palladium is the elemental metal and sodium cationic zeolite Y is the molecular sieve.

16. A process according to claim 1 in which elemental copper containing, sodium cationic zeolite Y is the molecular sieve.

17. A process according to claim 1 in which elemental nickel containing, sodium cationic zeolite Y is the molecular sieve.

References Cited by the Examiner

UNITED STATES PATENTS

| | | | |
|---|---|---|---|
| 2,944,005 | 7/1960 | Scott | 208—109 |
| 2,971,903 | 2/1961 | Kimberlin et al. | 208—46 |
| 2,971,904 | 2/1961 | Gladrow et al. | 208—46 |
| 2,983,670 | 5/1961 | Seubold | 208—46 |

DELBERT E. GANTZ, *Primary Examiner.*

ALPHONSO D. SULLIVAN, *Examiner.*

J. E. DEMPSEY, C. R. DAVIS, *Assistant Examiners.*